July 4, 1939.     A. H. GAEBEL     2,164,513
OPTICAL CONTRAST METER
Filed Aug. 25, 1936
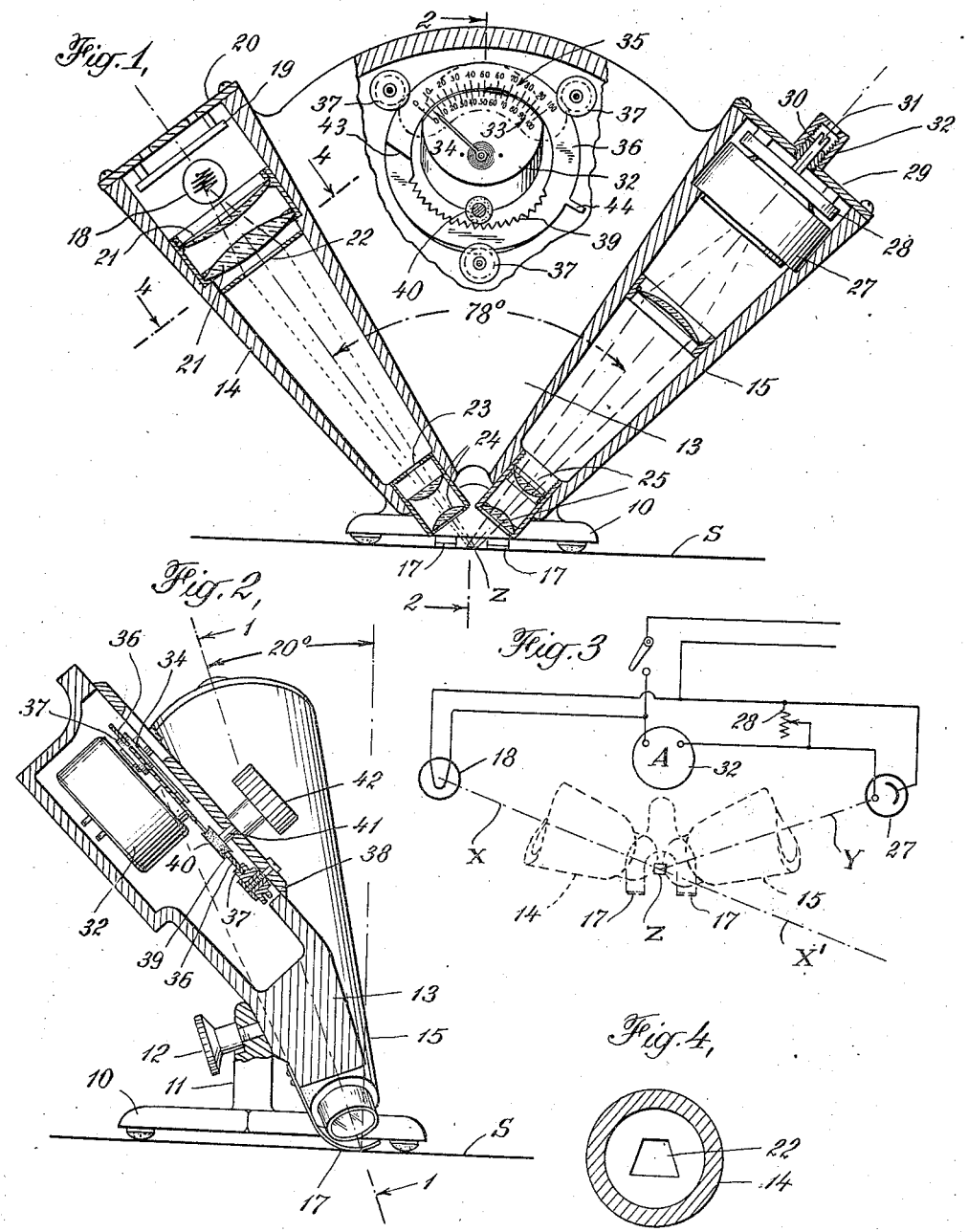
INVENTOR
Arthur H. Gaebel
BY
ATTORNEYS Patented July 4, 1939

2,164,513

UNITED STATES PATENT OFFICE 2,164,513

OPTICAL CONTRAST METER

Arthur H. Gaebel, Larchmont, N. Y.

Application August 25, 1936, Serial No. 97,726

4 Claims. (Cl. 88—14)

This invention relates to an optical contrast meter and has particular reference to a device for measuring and comparing the contrast between the light and dark portions of half-tones, printed matter, or the like, although the invention is not limited to that use.

In the modern newspaper plant it is the general practice to examine half-tones, printed matter and the like as the newspaper comes off the presses to be certain that the subject-matter conforms to a certain standard of contrast and definition, and as this has been heretofore done by mere optical examination, the judgment of the examiner is relied upon entirely as to whether or not the contrast and definition is such as to meet the requisite standards. This practice not only gives rise to natural errors due to human judgment, but in the event that the contrast is not thought to be sufficiently sharp, it is very difficult to ascertain whether the lack of contrast is due to the quality of the ink, a failure in the ink feed, the shade of the paper, the condition of the original picture, the half-tone etching, the condition of the type or mat, and the like, or to a combination of defects which contribute to producing inferior half-tones or printed matter.

In accordance with the present invention, an optical contrast meter is provided which automatically and instantaneously indicates on a dial the comparative contrast between the high light and shadow portions of a half-tone or other reproduction, or between the unprinted and printed portions of printed matter, or the like, with the same comparative fidelity as is observed by the normal human eye but with a greater degree of accuracy and uniformity.

The apparatus of this invention comprises a light source, a focusing system for directing a spot of the light slightly under one pica square on the area to be examined, and an optical system arranged to collect the light reflected indirectly and diffused from the illuminated subject area and refocus it upon the sensitive element of a photoelectric cell, the consequent current output of which actuates the pointer of a microammeter, the fixed scale of which is calibrated according to predetermined extremes of light and dark. Cooperating with this fixed scale is a similarly calibrated movable scale, whereby the difference between a reading on a high light and the reading on a shade on a half-tone, for example, may be compared instantly, or, alternatively, the initial reading of the lightness of the background paper may be compared with an adjacent printed portion and the like.

More particularly, the two optical systems, namely, the light-producing and the light-receiving systems are arranged at an angle to each other so that the light-receiving system is placed at the same angle to the vertical as the light-producing system in order to receive the light at the angle of reflection, and the axes of the two systems are in the same plane inclined to the normal to the subject surface, so that the direct light reflected from the surface of the subject is not applied to the sensitive element of the photoelectric cell, but rather, the indirect reflected light or partly reflected and partly diffused light is collected and directed on the photoelectric cell. This arrangement produces a close approximation of the actual contrast which is observed by the normal human eye under good illumination conditions, and consequently the reading of the instrument is a fair index of the contrast or color value actually observed by the reader.

It will be seen that with the new meter of this invention, the contrast between different portions of a half-tone or between the paper and a printed line of type may be quickly and automatically determined with a degree of accuracy which is absolute, since the same conditions of illumination and reflection obtain for the light areas of the subject as for the dark areas, other things being equal. Other important uses are in indicating the degree of ink penetration and also the opacity of the paper itself. Accordingly, the reason for a lack of definition or contrast may be immediately determined, whether it is due to the ink, the paper, the original etching or type, the photography, or the like. As a standard of whiteness comparison for the instrument, the freshly scraped surface of a block of magnesium carbonate is preferably employed, whereas a fresh deposit of carbon black is used as the darkness standard of comparison, the latter being 0 on the scale and the former 100 on the scale.

For a more complete understanding of the invention, reference may be had to the accompanying drawing, in which:

Figure 1 is a front view of the new optical contrast meter of this invention, shown partially in section, as seen along the line 1—1 of Fig. 2;

Fig. 2 is a vertical section through the meter as seen along the line 2—2 of Fig. 1;

Fig. 3 is a diagram in plan of the angular relationship of the axes of the light-producing and light-receiving optical means, together with a diagram of the photoelectric cell and ammeter circuit; and Fig. 4 is a section through the light-producing means as seen along the line 4—4 of Fig. 1.

Referring to the drawing, the new meter comprises a base 10 having tripod feet and a central standard 11 to which is secured by an assembling screw 12 the frame 13 of the meter. Secured to the frame 13 at opposite sides of the vertical center line of the meter and arranged at equal angles with respect thereto, are two, downwardly-converging, conical tubes 14 and 15, preferably arranged at an angle of approximately 78° with respect to each other. The axes of the two tubes 14 and 15 intersect approximately in the plane of the surface upon which the base 10 is supported.

Depending from the frame 13 are two spaced spring fingers 17, which are turned upwardly at their ends and normally project below the lowermost portions of the base 10, so that when the instrument is placed on a newspaper S, or the like, laid on a table, the fingers 17 straighten it out and stretch it tautly across the surface of the table, so that the relationship between the tubes 14 and 15 and the surface of the newspaper S, or the like, is always constant.

As shown particularly in Fig. 2, the tubes 14 and 15 are tilted rearwardly at an angle of approximately 20° with respect to the vertical or normal to the surface S being examined and upon which the instrument rests.

The tube 14 contains the light-directing optical system, including a source of light 18, which is preferably a 50-watt projection lamp of standard make. A suitable flat reflector 19 secured to the cover 20 of the tube reflects the light emanating from lamp 18 downwardly through the tube 14. A pair of condensing lenses 21 collect and direct the light in the form of a concentrated pencil through the peculiarly-shaped opening of a mask 22. The opening in this mask is keystone shaped, as is illustrated in Fig. 4, to compensate for the angular relation of the tube 14 and thus produces a square of light Z on the surface S after the pencil passes through the stop 23 and the focusing lenses 24. The spot of light Z directed on the surface S is approximately one pica square, i. e., approximately ⅙ of an inch square.

The other, or right hand tube 15, as seen in Fig. 1, contains the light-receiving system, including the focusing lenses 25 which direct the light entering them through a condensing lens or collimator, which concentrates a pencil of light upon the sensitive element of a photoelectric cell 27, which is of the self-generating type developing current directly proportional to the intensity of the incident light throughout a considerable range, and which has a color sensitivity almost identical with that of the average human eye. A rheostat 28 of the rotary type, secured to the cover 29 of the tube 15, is shunted across the terminals of the photoelectric cell 27, as shown in Figs. 1 and 3. The operating shaft 30 of the rheostat 28 is adjustable to vary the effective intensity of the ray. A suitable adjustment for this purpose is illustrated, by way of example as comprising a screw-driver slot 31 which is accessible through the hollow stud 32, there being an opening in the cover 29, through which the shaft 30 projects.

Supported on the frame 13 between the two tubes 14 and 15, so that its dial is readily visible from the front, is a micro-ammeter 32, connected to the photoelectric cell 27 so as to be energized by the current generated therein. The sensitivity of the ammeter 32 is such that each division from zero to 100 on the scale 33 preferably represents .000001 ampere, so that the pointer 34 indicates extremely small variations in the current output of the photoelectric cell 27. The ammeter itself, 32, is of more or less conventional form, so that it is not necessary to describe it.

Positioned concentrically with respect to the dial 33 is a second dial 35 having subdivisions preferably reading from zero to 100 and equal to those on dial 33, so that when the two dials are arranged with their zero marks coincident, the corresponding graduations of each are also in alignment. For certain applications, the relationship between the scale markings in normal position may be different as for instance, the scale on the movable dial may extend from 100 to 0 and be aligned with markings on the stationary scale graduated from 0 to 100, respectively. This dial 35 is mounted on or inscribed on a ring 36 rotatably mounted on three grooved rollers 37 supported on a face plate 38 suitably mounted on the frame 13 over an opening therein. The inner edge of the ring 36 opposite the scale 35 is serrated or provided with teeth 39 which are frictionally engaged by a rubber roller 40 located opposite one of the supporting rollers 37 and mounted on a shaft 41 journalled through face plate 38 and having a knob 42 secured to its outer end.

The ring 35 is preferably slotted at one side 43 to render it springy, so that it will take up any play between its rollers 37 and 40 and so as to accommodate unequal temperature expansion between itself and the adjacent parts. A stop 44 is mounted on the ring 36 for engagement with either of the two rollers 37 between which it is located, to prevent overthrow of the dial 35. By rotating knob 42 the dial 35 may be moved relatively to the dial 33 in a manner readily understood.

The scale 33 is calibrated with respect to the output of the photoelectric cell 27 in such a way that the zero reading represents the quantity of light received by the photoelectric cell from a fresh deposit of carbon black. The 100 reading on the scale 33 represents the light received by the photoelectric cell 27 from a freshly-scraped or cleaned surface of a block of magnesium carbonate. The zero reading on the scale 33 accordingly represents the standard of comparison for shadow or blackness, as determined from the carbon black, while the 100 reading on the scale 33 represents the standard of comparison of high light or lightness as determined from the magnesium carbonate.

In operation, the new contrast meter of this invention is placed upon a newspaper or the like, the relative lightness and darkness of which is to be measured for contrast with the above described standard. Assuming that it is desired to measure the contrast between the high-lights and shadows of a half-tone, the instrument is placed on the newspaper with the fingers 17 spanning an area of the half-tone which is selected as a dark or shadow portion to be measured. The fingers 17, because of their resiliency, stretch and hold smooth the selected portion of the subject surface S.

The specific portion of the subject surface S is readily aligned with the instrument after it is turned on by shifting the instrument bodily so that the square spot of light Z emanating from focusing lenses 24 impinges upon the selected area. The ammeter 32 immediately responds to the current generated by the photoelectric cell 27 to move the pointer 34 to the right of zero to indicate the relative degree of shadow of that portion of the half-tone with respect to the darkness standard of comparison, namely, carbon black, which is represented by the zero graduation.

Although, as seen from the front, Fig. 1, tubes 14 and 15 are arranged symmetrically about the normal, so that the angle of reception by the photo cell 27 appears to be equal to the angle or direction of incidence of the light emanating from the tube 14, the rearward tilt of both tubes from the normal, as seen in Fig. 2, displaces the photo cell out of the plane of the axis of reflection as is illustrated in the plan diagram of Fig. 3, where line X represents the axis of the tube 14 and Y the axis of the tube 15. It will be observed that the line Y is displaced from or not aligned with a continuation of the line X, namely, X', because of the rearward tilt of the tubes 14 and 15. Accordingly, the photoelectric cell 27 receives only a portion of the reflected light from the illuminated spot Z on the subject surface S, such light as it does receive being partly reflected and partly diffused light. Careful experimentation determined the proper angles, both the angle of 78° between the tubes 14 and 15 as seen in front view, Fig. 1, and the angle of backward tilt of 20° of the two tubes 14 and 15, Fig. 2, in order to simulate as nearly as is possible the light reflection and diffusion which occurs during reading of the newspaper by the average human eye. These angles of 78° and 20° are variable within limits, depending upon circumstances. The rheostat 28 is adjusted to compensate for differences in voltage in different localities, the instrument being tested before use with a standard of whiteness and a standard of blackness furnished with it.

The movable dial 35 is then adjusted by means of knob 42 so that its zero mark is located opposite the pointer 34 or the designation on scale 33 indicated by the pointer. The instrument is then moved to a selected high light on the halftone, and the reading indicated by the pointer 34 on the dial 33 represents the lightness of that high light with respect to the whiteness represented by the standard of comparison, namely, magnesium carbonate. The pointer indicates on scale 35 the difference in units of contrast between the high light and the shadow of the half-tone.

The same comparison may be made between the printed matter and the paper or newsprint upon which it is printed. For example, it has been found that printing made with a good grade of ink and solid type usually gives a reading of from 15 to 22, and a good grade of newsprint gives a reading of from 85 to 90. Similarly, a good half-tone will give a contrast reading of about 70 units between the lightest and the darkest portions. A dull reproduction may fall as low as 35 or 40 units of contrast. Thus, for practical newspaper work, for example, the newsprint may be examined from samples before it is purchased to determine its degree of whiteness, a sample of printed matter may be examined for its degree of darkness, or both may be contrasted in the manner described. After printing, the contrast between the printed matter and the paper readily indicates the fault of a dull reproduction or print and the responsibility for the defect may be determined promptly, whether it is the ink, ink feed, paper, mat, etching, ink penetration, opacity of the paper itself, or the like.

Where the instrument is to be used in the engraving department as a matter of routine, contrast control measurements are accordingly no longer a matter of visual comparison or judgment but become numerical values which may be duplicated at any future date or filed for reference. Thus the new instrument of this invention provides a valuable adjunct to scientific newspaper work, whereby standards of contrast and sharpness of definition may be maintained at all times. In addition to newspaper work, the new instrument has innumerable other uses for comparing color values under conditions most nearly approximating the normal observation of the subject by the average human eye.

I claim:

1. In an optical contrast meter, the combination of a support, means mounted on said support for directing a beam of light upon and at an acute angle to a surface, a photo-electric cell, means also mounted on said support and inclined with respect to said surface for directing a reflected portion of the beam of light upon the photo-electric cell, a meter actuated by said photo-electric cell having an element with a graduated scale and a pointer movable across the scale from zero to maximum, such deflection corresponding to the amount of light reflected by said surface, said zero and maximum deflections corresponding to the reflecting power of carbon black and freshly scraped magnesium carbonate, respectively, a member carried by said support having an identically graduated scale, said member being associated with and adapted to be registered with the first scale, and means for moving said member with respect to said first scale to align the graduations of the two scales at any desired setting to afford direct determination of the differences in reflecting power of different portions of said surface.

2. In an optical contrast meter, the combination of a support adapted to be placed on a horizontal surface, a light projecting device on said support for directing a beam of light on said surface, a photo-electric cell on said support, a light receiving device mounted on said support for directing a portion of the beam of light reflected by said surface onto the photo-electric cell, the axes of said light projecting and light receiving devices lying in a common plane inclined with respect to a plane perpendicular to said surface and converging downwardly in the plane at equal angles to the vertical, a meter on said support having a graduated scale and a pointer adapted to be deflected from zero deflection to maximum deflection in accordance with the output of said photo-electric cell, the zero deflection and maximum deflection corresponding to the reflecting power of carbon black and freshly scraped magnesium carbonate, respectively, said scale extending from zero deflection to maximum deflection of said pointer, a member having a second scale mounted on said support, said scale having identical graduations with and adapted to be registered with said first scale and means for moving said member and said second scale with respect to said first scale to align the graduations of the two scales at any desired setting to determine directly the differences in reflecting power of different portions of a surface.

3. In an optical contrast meter, the combination of a support adapted to be placed on a horizontal surface, a light projecting device mounted thereon for directing a beam of light at an angle upon a portion of the surface of a subject, a photo-electric cell on the support, a light receiving device mounted on the support for collecting light emanating from the said portion of the surface and directing it upon the cell, the axes of the said light projecting and light receiving devices being in a common plane inclined to a plane perpendicular to said surface, a meter on the support for measuring the output of the cell comprising a pointer and a member having an arcuate edge and a calibrated scale arranged adjacent said edge, a second member on said support having a portion concentric with the arcuate edge of the first member, said portion being calibrated identically with the meter scale to form a second scale, the calibrations of both scales being adapted to be radially aligned with each other, said pointer adapted to be deflected from zero deflection to maximum deflection, said zero and maximum deflections corresponding to the reflecting power of carbon black and freshly scraped magnesium carbonate, respectively, and means for moving said second member and scale with respect to said first member and scale to align the calibrations of the two scales at any desired setting to determine directly the differences in reflecting power of different portions of a surface.

4. In an optical contrast meter, the combination of a support adapted to be placed on a surface, means on the support for holding smooth a portion of a subject, the contrast of which is to be determined, a light projecting device mounted on the support, a light receiving device mounted on the support, the axes of said devices being disposed in a common plane inclined at an angle of about 20° to a plane perpendicular to the surface of the subject and converging at an angle of about 78° downwardly in the said plane for respectively projecting a beam of light and receiving a portion of said beam reflected from the subject, a photo-electric cell on the support upon which the reflected portion of the beam is directed by the light receiving device, and a meter on the support for indicating the output of the cell comprising a pointer and a member having an arcuate edge and a calibrated scale thereon adjacent said edge, a second member on said support having a portion concentric with and at all times substantially in contact with the arcuate edge of said first member, said second member being mounted for movement about and with respect to said arcuate edge of the first member and having a calibrated scale on its concentric portion identical with the scale on said first member, the calibrations of the respective scales being radially aligned and extending between zero and maximum deflection of the pointer, said zero and maximum deflections corresponding to the reflecting power of carbon black and freshly scraped magnesium carbonate respectively, and means for moving said second member and scale with respect to said first member and scale to align the calibrations of the two scales at any desired setting to determine directly the differences in reflecting power of different portions of a surface.

ARTHUR H. GAEBEL.